United States Patent
Reichinger et al.

(10) Patent No.: US 10,150,103 B2
(45) Date of Patent: Dec. 11, 2018

(54) SCR CATALYST HAVING IMPROVED ADHESION OF THE ZEOLITE-CONTAINING CATALYTIC LAYER

(71) Applicant: Clariant International Ltd., Muttenz (CH)

(72) Inventors: Markus Reichinger, München (DE); Gerd Maletz, Bad Aibling (DE); Andreas Bentele, Leverkusen (DE); Martin Schneider, Pfinztal (DE); Klaus Wanninger, Kolbermoor (DE); Kristof Eisert, München (DE)

(73) Assignee: Clariant International Ltd. (CH)

( * ) Notice: Subject to any disclaimer, the term of this patent is extended or adjusted under 35 U.S.C. 154(b) by 0 days.

(21) Appl. No.: 15/555,221

(22) PCT Filed: Feb. 24, 2016

(86) PCT No.: PCT/EP2016/053882
§ 371 (c)(1),
(2) Date: Sep. 1, 2017

(87) PCT Pub. No.: WO2016/139102
PCT Pub. Date: Sep. 9, 2016

(65) Prior Publication Data
US 2018/0050326 A1    Feb. 22, 2018

(30) Foreign Application Priority Data
Mar. 5, 2015 (DE) .................. 10 2015 204 012

(51) Int. Cl.
| | |
|---|---|
| *B01J 29/06* | (2006.01) |
| *B01J 29/40* | (2006.01) |
| *B01J 29/072* | (2006.01) |
| *B01J 29/76* | (2006.01) |
| *B01J 37/02* | (2006.01) |
| *B01J 37/30* | (2006.01) |
| *B01D 53/90* | (2006.01) |
| *B01D 53/94* | (2006.01) |
| *B01J 29/80* | (2006.01) |
| *B01J 35/02* | (2006.01) |
| *F01N 3/20* | (2006.01) |
| *B01J 29/46* | (2006.01) |
| *B01J 29/72* | (2006.01) |

(52) U.S. Cl.
CPC .............. *B01J 29/40* (2013.01); *B01D 53/90* (2013.01); *B01D 53/9418* (2013.01); *B01J 29/072* (2013.01); *B01J 29/7615* (2013.01); *B01J 29/80* (2013.01); *B01J 35/023* (2013.01); *B01J 37/0215* (2013.01); *B01J 37/0246* (2013.01); *B01J 37/30* (2013.01); *F01N 3/2066* (2013.01); *B01D 53/9477* (2013.01); *B01D 2251/2062* (2013.01); *B01D 2255/20738* (2013.01); *B01D 2255/502* (2013.01); *B01D 2255/504* (2013.01); *B01D 2255/9155* (2013.01); *B01D 2255/9202* (2013.01); *B01D 2255/9207* (2013.01); *B01D 2258/012* (2013.01); *B01J 29/46* (2013.01); *B01J 29/7215* (2013.01); *B01J 2029/062* (2013.01); *B01J 2229/186* (2013.01); *F01N 2370/04* (2013.01); *F01N 2510/063* (2013.01); *Y02T 10/24* (2013.01)

(58) Field of Classification Search
CPC ...... B01J 29/072; B01J 29/46; B01J 29/7615; B01J 28/80; B01J 2029/062; B01J 2229/186; B01J 35/023; B01J 37/0215; B01J 37/30; B01J 29/40; B01J 29/7007; B01J 29/80
USPC ...................... 502/64, 66, 67, 69, 71, 74, 77
See application file for complete search history.

(56) References Cited

U.S. PATENT DOCUMENTS

| | | | |
|---|---|---|---|
| 5,589,147 A | 12/1996 | Farnos et al. | |
| 6,074,973 A * | 6/2000 | Lampert | B01D 53/945 423/213.2 |
| 6,951,638 B1 | 10/2005 | Burgfels et al. | |
| 7,244,409 B2 | 7/2007 | Burgfels et al. | |
| 7,393,804 B2 * | 7/2008 | Matsumoto | B01D 53/9418 423/213.2 |
| 8,147,952 B2 | 4/2012 | Iwamoto et al. | |
| 8,883,100 B2 | 11/2014 | Paulus et al. | |
| 2009/0269285 A1 | 10/2009 | Ando et al. | |
| 2013/0102819 A1 | 4/2013 | Szesni et al. | |
| 2014/0328738 A1 * | 11/2014 | Chandler | B01J 37/0246 423/213.2 |

FOREIGN PATENT DOCUMENTS

| | | |
|---|---|---|
| EP | 2123614 | 11/2009 |
| WO | WO 2011/125050 | * 10/2011 |

OTHER PUBLICATIONS

Avila et al., "Monolithic reactors for environmental applications", Chemical Engineering Journal, vol. 109, 2005, pp. 11-36.*
PCT International Search Report for PCT/EP2016/053882, dated Apr. 26, 2016.
T. Alexander Nijhuis et al. "Preparation of monolithic catalysts", Catalysis Reviews: Science and Engineering, vol. 43, No. 4, pp. 345-380, XP055242646, Nov. 13, 2001.

* cited by examiner

*Primary Examiner* — Elizabeth D Wood

(57) ABSTRACT

The invention relates to: a catalytic composition that is active in the selective catalytic reduction of nitric oxides, containing an iron-containing MFI-type zeolite and an iron-containing BEA-type zeolite, wherein the weight average particle size d50 of the MFI-type zeolite and the BEA-type zeolite is different; a method for producing an SCR catalyst; and the SCR catalyst produced in this way. The adhesion of the coating is improved in that the weight average particle sizes of the MFI-type and BEA-type zeolites are different.

12 Claims, No Drawings

SCR CATALYST HAVING IMPROVED ADHESION OF THE ZEOLITE-CONTAINING CATALYTIC LAYER

The present invention relates to a catalytic composition which is active in the selective catalytic reduction of nitrogen oxides and which comprises an iron-containing MFI-type zeolite and an iron-containing BEA-type zeolite, the weight-average particle sizes d50 of the MFI-type zeolite and of the BEA-type zeolite being different. The invention also relates to a method for producing an SCR catalyst with the active catalytic composition, and to the SCR catalyst produced accordingly.

From the dawn of concerns with regard to exhaust gas purification, great efforts have been undertaken to bring about continual reductions in the level of pollutant emissions from internal combustion engines. Measures within the engine itself will in future no longer be enough to fulfil the statutory impositions. Modern systems for exhaust gas aftertreatment are therefore necessary, to allow the exhaust gas limits to be respected. For the exhaust gas aftertreatment of diesel engines, for example, systems which have already been realized or are at the trial stage include the following:

selective catalytic reduction (SCR process),
NOx reduction catalysts (NSR),
diesel oxidation catalysts (DOC),
catalytically coated particle filters,
combinations of various systems, such as Continuously Regenerating Trap (CRT system), SCRT process, DPNR process.

The surface of the catalysts used in these systems has an active coating for accelerating the relevant reaction. As the catalyst substrate to which the coating is applied, it is common to employ a catalyst substrate composed of ceramic or metallic support materials.

When using metallic support materials in particular it has emerged that the catalytically active composition, which is applied in the form of a washcoat, often proves inadequate in its adhesion to the metallic support. To apply a sufficient quantity of catalytically active material to the support materials, such cases necessitate repeated coating procedures. Coating the support materials by means of multiple repeated procedures raises the complexity and the costs necessarily involved in the production of the catalysts.

U.S. Pat. No. 8,147,952 B2 provides a coating material for a honeycomb structure, the coating material comprising organic or inorganic particles which have a d90/d10 ratio of between 5 to 50, where d10 is equal to 50 µm or less and d90 is equal to 4 µm or less (with d10 and d90 being, respectively, values of 10% diameter and 90% diameter, based on the volume fraction of a particle diameter distribution measured by laser diffractometry/scattering method, starting from the side of the small particle diameters).

U.S. Pat. No. 7,393,804 B2 describes an exhaust gas purification catalyst having a catalytic component which comprises copper, ZSM-5, and zeolite beta, in which the ZSM-5 has a molar $SiO_2/Al_2O_3$ ratio of (20-100)/1 and an average crystallite diameter, as observed under the electron microscope, in a range not exceeding 0.5 µm, the zeolite β has an $SiO_2/Al_2O_3$ ratio of (10-50)/1, and the weight ratio of the ZSM-5 to the zeolite β is in the range from 1:0.1 to 1:5. This exhaust gas purification catalyst reduces nitrogen oxides even in low temperature ranges and proves durable even under high thermal load.

U.S. Pat. No. 5,589,147 describes a method for treating exhaust gas that uses a specifically produced catalyst composition for the selective catalytic reduction of $NO_x$ contained within exhaust gases. One embodiment of the method of the invention includes a catalytic stage for selective catalytic reduction of the $NO_x$ over a catalyst composition comprising a molecular sieve, this sieve having been treated with a metal in such a way as to effectively maximize metal dispersion. The catalyst of this method typically comprises silicon dioxide, titanium dioxide or zirconium dioxide binder—for example, a binder comprising a silicone resin which is functionalized with hydroxyl groups and has a high molecular weight. The catalyst can be brought into the desired form by means of extrusion, for example, and can be aged in a moistened atmosphere.

EP 2123614 A2 describes a honeycomb structure which comprises a honeycomb structural unit, comprising a zeolite and also an inorganic binder, and which has a multiplicity of separating walls which are disposed in the longitudinal direction of the honeycomb structural unit and which define a multiplicity of flow passage openings separated by the separating walls. The zeolite comprises a first zeolite, which is exchanged with one or more types of metal ions selected from the group consisting of Cu, Mn, Ag, and V, and a second zeolite which is exchanged with one or more kinds of metals ions selected from the group consisting of Fe, Ti, and Co. The ratio of the weight of the first zeolite to the total weight of the first and second zeolites is greater in the middle of the separating wall than on the surface thereof. The ratio of the weight of the second zeolite to the total weight of the first and second zeolites is greater on the surface of the separating wall than in its middle.

WO 2011/125050 A1 describes in principle the possibility of using a combination of zeolites of different types for producing SCR catalysts. However, WO 2011/125050 A1 gives no indication of how to obtain a catalyst wherein the washcoat adheres more effectively to the support materials.

It was an object of the present invention, therefore, to provide an SCR catalyst which has a coating that exhibits improved adhesion to ceramic and/or metallic support materials.

The object stated above is achieved by means of a catalytic composition comprising an iron-containing MFI-type zeolite and an iron-containing BEA-type zeolite, the weight-average particle sizes d50 of the zeolites being different.

The MFI-type zeolite preferably has a weight-average particle size d50 in the range from 2 to 10 µm, and the BEA-type zeolite preferably has a weight-average particle size d50 in the range from 0.1 to 3 µm.

The catalytic composition is preferably a composition which is active in the selective catalytic reduction of nitrogen oxides (SCR catalyst).

An SCR catalyst for the purposes of the present invention is a catalyst which enables the selective catalytic reduction of nitrogen oxides from exhaust gases from internal combustion engines and also power plants. With an SCR catalyst, there is selective reduction only of the nitrogen oxides NO and $NO_2$ (generally referred to as $NO_x$), with $NH_3$ (ammonia) commonly being admixed for the reaction. The only reaction products are therefore the unobjectionable substances water and nitrogen.

The MFI-type zeolite preferably has a weight-average particle size d50 in the range from 2 to 10 µm, more preferably in the range from 4 to 8 µm.

The BEA-type zeolite preferably has a weight-average particle size d50 in the range from 0.1 to 3 µm, more preferably in the range from 0.2 to 2 µm.

The weight-average particle size d50 of the MFI-type zeolite differs preferably from that of the BEA-type zeolite by at least 5 µm, more preferably by 2 µm, and very preferably by 0.5 µm.

The weight-average particle size d50, or median, serves as a measure of the average particle size, here meaning that 50 weight percent of the sample has a particle size smaller than the value of the weight-average particle size d50, and the other 50 weight percent of the sample has a particle size greater than the value of the weight-average particle size d50.

The term "zeolite" refers in general, in accordance with the definition of the International Mineralogical Association (D. S. Coombs et. al., Can. Mineralogist, 35, 1997, 1571), to a crystalline substance from the group of the aluminum silicates having a three-dimensional network structure of the general formula $$M^{n+}{}_{x/n}[(AlO_2)_x(SiO_2)_y]*z(H_2O)$$

and consisting of $SiO_4/AlO_4$ tetrahedra linked by common oxygen atoms to form a regular three-dimensional network. The zeolite structure contains open cavities in the form of channels and cages, which are normally occupied by water molecules and extra framework cations which can be exchanged. For each aluminum atom there is an excess negative charge which is compensated by these cations. The Si/Al ratio y/x is always ≥1 in accordance with "Löwenstein's Rule", which prohibits the adjacent occurrence of two adjacent, negatively charged $AlO_4$ tetrahedra. The more aluminum and the less silicon there is in a zeolite, the denser the negative charge in its lattice and the more polar its internal surface area. When the Si/Al ratio is low, there are more exchange sites available for metals, but the zeolite becomes increasingly less stable thermally.

The zeolite structure contains cavities and channels which are characteristic of each zeolite. According to their topology, the zeolites are divided into different structural types, which are identified with a three-digit code (framework type code, FTC). Within the description of this invention, the mention of zeolite types MFI and BEA refers to the respective structural type MFI and BEA as identified by statement of the FTC.

The molar $SiO_2/Al_2O_3$ ratios of the MFI-type zeolite and of the BEA-type zeolite are preferably each in the range from 5 to 150, more preferably in the range from 15 to 100. Very preferably the molar $SiO_2/Al_2O_3$ ratio of the MFI-type zeolite is in the range from 20 to 80, more preferably still in the range from 20 to 50. Very preferably the molar $SiO_2/Al_2O_3$ ratio of the BEA-type zeolite is in the range from 30 to 80, more preferably still in the range from 30 to 50.

The zeolites of types MFI and BEA have relatively large pore diameters of 5.1 Å to 5.6 Å in each case.

The catalytic composition of the invention, apart from iron, preferably contains transition metals and/or transition-metal oxides. With particular preference the catalytic composition of the invention additionally comprises nickel, copper, cobalt, manganese, rhodium, rhenium and/or vanadium oxides, and also mixtures of two or more of these compounds. The MFI-type zeolite preferably comprises copper as well as iron, and the BEA-type zeolite independently thereof but likewise preferably comprises copper as well as iron.

The MFI-type zeolite preferably comprises iron in amounts by weight of 0.7 to 4.9 wt %, more preferably in amounts of 1.4 to 4.2 wt %, very preferably in amounts of 2.1 to 3.5 wt %, based on the weight of the iron-containing MFI-type zeolite. The BEA-type zeolite preferably comprises iron in amounts by weight of 0.3 to 3.9 wt %, more preferably in amounts of 1 to 3.1 wt %, very preferably in amounts of 1.7 to 2.5 wt %.

The MFI-type zeolite preferably comprises iron, calculated as $Fe_2O_3$, in amounts by weight of 1 to 7 wt %, more preferably in amounts of 2 to 6 wt %, very preferably in amounts of 3 to 5 wt %, based on the weight of the iron-containing MFI-type zeolite. The BEA-type zeolite preferably comprises iron, calculated as $Fe_2O_3$, in amounts by weight of 0.4 to 5.5 wt %, more preferably in amounts of 1.4 to 4.5 wt %, very preferably in amounts of 2.4 to 3.5 wt %.

Iron in the catalytic composition of the invention is present preferably in cationic form, either as the metal cation or as a cationic complex containing iron as central atom. It is preferred here for these cations to compensate the negative charge of the zeolite parent structure. In that case the cations are present as counterions to the negative charges in the cavities and channels of the zeolite. The iron may, however, also be present wholly or partly in the form of iron oxide.

The weight ratio of the MFI-type zeolite to the BEA-type zeolite is preferably in the range of 1:10 to 10:1, more preferably in the range of 1:5 to 5:1, very preferably in the range of 1:2 to 2:1, more preferably still in the range of 1:1.

The BET surface area of the SCR catalyst of the invention is preferably in the range from 100 m²/g to 1500 m²/g, more preferably in the range from 150 m²/g to 1000 m²/g, and very preferably in the range from 200 m²/g to 600 m²/g. The BET surface area here is determined by nitrogen adsorption in accordance with DIN 66132.

In one particularly preferred embodiment, the present invention pertains to a catalytic composition comprising an MFI-type zeolite having a weight-average particle size d50 in the range from 2 to 10 µm and a BEA-type zeolite having a weight-average particle size d50 in the range from 0.1 to 3.0 µm.

In one especially preferred embodiment, the present invention pertains to a catalytic composition comprising an MFI-type zeolite having a weight-average particle size d50 in the range from 4 to 8 µm and a BEA-type zeolite having a weight-average particle size d50 in the range from 0.2 to 2 µm wherein the MFI-type zeolite and the BEA-type zeolite independently of one another each contain iron in amounts by weight of 0.1 to 10 wt %.

The catalytic composition is preferably processed into a washcoat and applied to a suitable support material. On the basis of the properties of the catalytic composition, there is improved adhesion of a coating produced therewith to the support material.

A further subject of the invention is therefore a washcoat which comprises the catalytic composition identified above. For this purpose the catalytic composition is preferably mixed with a binder. Suitable binders are aluminum oxide binders, aluminum oxide-silicon oxide binders, or silicon dioxide binders. These binders are all aluminum oxides, silicon dioxides, and silicon oxide-aluminum mixed oxides which are normally employed in SCR catalysts. The aluminum oxide binder may comprise (pseudo-) boehmite or aluminum-oxide sol. Prior to or during its combination with the zeolite and any further components, the aluminum oxide binder is commonly peptized. Moreover, silicon dioxide and/or crystalline aluminum oxide may be present in the mass, and, optionally fillers such as clay, e.g., kaolin, are used. The washcoat commonly includes up to 20 wt % of binder, preferably aluminum oxide binder, although even higher quantities may also be used.

In a further embodiment, the present invention pertains to a method for producing an SCR catalyst, comprising the steps of:
a) providing a washcoat as described above,
b) contacting the washcoat with a support material, and
c) drying the support material obtained according to step b).

According to one preferred embodiment, the method comprises the following steps:
a) providing a washcoat comprising an MFI-type zeolite having a weight-average particle size d50 in the range from 2 to 10 μm and a BEA-type zeolite having a weight-average particle size d50 in the range from 0.1 to 3 μm, and a binder,
b) contacting the washcoat with a support material, and
c) drying the support material obtained according to step b).

In step a) the MFI-type zeolite and the BEA-type zeolite, already described above, are mixed with a binder.

In step b) the support material is coated by being contacted with the washcoat. Suitable catalyst supports or support materials are metallic or ceramic supports. Preferred support material is a metallic or ceramic support material present in each case as a monolithic support. A catalyst which comprises support materials and catalytically active coatings is referred to as a coated catalyst. The coating is applied with what is called a washcoat suspension, this being a slurry of the catalytically active substance in a fluid medium, to the catalyst support. A further subject of the present invention, accordingly, is a method for producing SCR catalysts.

Support material used for honeycombs of shaped ceramic bodies includes, for example, materials such as cordierite, steatite, turanite or silicon carbide, or shaped bodies made of silicon dioxide, aluminum oxides, aluminates or else metals and metal alloys. The use of metals and metal alloys makes it possible in particular to produce honeycomb bodies of complex structure, such as honeycombs with open channel structures or with complex mixed systems, for example.

The support material may be in the form of honeycombs. The honeycombs either consist of what is called a honeycomb body, which may be composed of a honeycomb shell and a support inserted therein, more particularly a partly structured and wound sheet-metal foil, or consist entirely of a shaped ceramic body. The honeycombs are traversed here substantially by channels extending parallel to the honeycomb axis.

The coating here may take place by a variety of methods. In general, first of all, the washcoat is prepared with water, optionally with addition of additives, such as surfactants, active catalytic components, pore formers, rheological assistants, and other adjuvants, and then the support material is filled with the washcoat by means of an immersion, suction or pumping operation. One simple method for contacting the washcoat with a support material is to immerse the support material into the washcoat and to remove excess washcoat by using air to blow it out and/or by suction removal of the air. Another possibility is to carry out coating using centrifuges, or to spray the support material with the washcoat. The MFI-type and BEA-type zeolites here are applied in layers to the support material, with the MFI-type and BEA-type zeolites being present jointly in one layer on the support material.

In a step c), a support material coated with a washcoat is dried. The dried support material is optionally calcined in a further step. Lastly, preferably, the support material is calcined at a temperature in the range from 350° C. to 700° C., more preferably in the range from 450° C. to 650° C.

A further subject of the invention is an SCR catalyst comprising the above-described catalytic composition, or an SCR catalyst produced by the method specified above.

The SCR catalyst of the invention is suitable for reducing emissions of nitrogen oxide by mobile or stationary combustion installations. Mobile combustion installations are, for example, internal combustion engines of motor vehicles, especially diesel engines, power generation assemblies based on internal combustion engines, or other assemblies based on internal combustion engines. The stationary combustion installations are commonly power plants, firing plants, refuse incineration plants, and also heating systems of private households. A further subject of the present invention, therefore, is the use of an SCR catalyst for selective reduction of nitrogen oxides.

A further subject of the invention is an exhaust gas cleaning system which comprises an SCR catalyst of the invention. The exhaust gas cleaning system may further comprise additional components, preferably a diesel oxidation catalyst (DOC) for oxidizing hydrocarbons, a diesel particulate filter for reducing particulate emissions, optionally a hydrogenation catalyst for preparation of urea, and also a barrier catalyst downstream of the SCR catalyst and serving as ammonia oxidation catalyst (slip catalyst).

The invention is elucidated in more detail below with a number of working examples which should not, however, be interpreted as imposing any restriction on the scope of the invention.

EXAMPLES

Determination of Particle Size

The weight-average particle size d50 of the zeolites which are used in this invention is determined using a Malvern Mastersizer 2000 and a Malvern Hydro 2000S dispersing unit. This apparatus, produced by Malvern Instruments, Malvern, England, utilizes the principle of Mie scattering, using a low-energy He/Ne laser. Ahead of the measurement, the sample is initially dispersed with ultrasound in water for 5 minutes to form an aqueous suspension. This suspension is stirred before being measured with the measuring technique described in the operating instructions for the apparatus. The Malvern Mastersizer measures the weight-average particle size distribution of the zeolite. The weight-average particle size d50 is readily obtainable from the data generated by the apparatus.

Materials
1. Iron-containing zeolite of type MFI ("Fe-MFI") from Süd-Chemie Zeolites GmbH (tradename: Fe-TZP-302), iron content: 2.8 wt %, distribution of weight-average particle size: d10=1.98 μm, d50=6.42 μm, d90=12.21 μm.
2. Iron-containing zeolite of type BEA ("Fe-BEA") from Süd-Chemie Zeolites GmbH (tradename: Fe-TZB-2231), iron content: 2.1 wt %, distribution of weight-average particle size: d10=0.19 μm, d50=0.47 μm, d90=2.45 μm.
3. Iron-containing zeolite of type MFI ("FeCZP 30.2") from Süd-Chemie Zeolites GmbH, iron content: 2.2 wt %, distribution of weight-average particle size: d10=2.73 μm, d50=7.41 μm, d90=13.81 μm.
4. Iron-containing zeolite of type BEA ("FeCZB 30") from Süd-Chemie Zeolites GmbH, iron content: 2.2 wt %, distribution of weight-average particle size: d10=0.6 μm, d50=6.73 μm, d90=13.93 μm.

Production of Washcoat Suspension and of Coated Substrate

Example 1

75 g of Fe-BEA and 75 g of Fe-MFI were dispersed in 275 ml of water. Then 130 g of AL 20 DW (colloidal aluminum sol) from Nyacol were added. The suspension was dispersed for several minutes. This was followed by coating of a metallic substrate (1 inch diameter, 2 inch length, 400 cpsi) by immersion of the substrate into the washcoat suspension and subsequent suction removal or blowing out in order to remove excess washcoat suspension. Depending on the desired catalyst loading, one to two coating steps were required.

Example 2

The suspension and the coated substrate were produced as in example 1, but using the samples FeCZP 30.2 and FeCZB 30.

Determination of Adhesion

The adhesion of the washcoat can be determined by means of what is called the thermal shock test. For this purpose, a metal honeycomb coated as described above was weighed, then heated to a temperature in the range from 650° C. to 850° C., and subsequently cast into a vessel containing cold water. The water underwent sudden evaporation. The evaporation of water, in conjunction with the sudden cooling, represents a very great physical load on the washcoat. The amount of washcoat delaminated was then ascertained. This was done by drying the substrate at 120° C. and subsequently weighing it. The weight difference found corresponds to the amount of delaminated washcoat.

The thermal shock test described above was carried out a number of times, with table 1 summarizing the results.

TABLE 1

| Catalyst | d50 MFI [μm] | d50 BEA [μm] | Loss [%] |
| --- | --- | --- | --- |
| Example 1 | 6.42 | 0.47 | 13.6 |
| Example 2 | 7.41 | 6.73 | 33.3 |
| Fe—BEA | — | 0.47 | 41.6 |

The examples show that as the difference in the weight-average particle sizes d50 goes up between the two types of zeolite (d50 value MFI and d50 value BEA), there is an increase in the adhesion of the washcoat on the honeycomb. The loss of washcoat in the case of examples 1 and 2 is 13.6% and 33.3% respectively, based on the amount of washcoat originally present, whereas the loss in the case of a catalyst coated only with Fe-BEA is 41.6%, based on the amount of washcoat originally present. Since low washcoat loss points to improved adhesion, the catalysts coated in accordance with the invention exhibit improved adhesion of the washcoat on the support material.

What is claimed is:

1. A catalytic composition comprising an iron-containing MFI-type zeolite and an iron-containing BEA-type zeolite, wherein the weight-average particle sizes d50 of the zeolites are different, wherein the weight-average particle sizes d50 of the zeolites differ by at least 0.5 μm and wherein the BEA-type zeolite has a weight-average particle size d50 in the range from 0.1 to 3 μm and the MFI-type zeolite has a weight-average particle size d50 in the range from 2 to 10 μm.

2. A catalytic composition as claimed in claim 1, wherein the weight-average particle sizes d50 of the zeolites differ by at least 2 μm.

3. A catalytic composition as claimed in claim 1, wherein the BEA-type zeolite has a weight-average particle size d50 in the range from 0.2 to 2 μm.

4. A catalytic composition as claimed in claim 1, wherein the MFI-type zeolite has a weight-average particle size d50 in the range from 4 to 8 μm.

5. A catalytic composition as claimed in claim 1, wherein the weight ratio of the MFI-type zeolite to the BEA-type zeolite is in the range of 1:10 to 10:1.

6. A catalytic composition as claimed in claim 1, wherein the MFI-type zeolite comprises iron in amounts by weight of 0.7 to 4.9 wt %, based on the weight of the iron-containing MFI-type zeolite, and the BEA-type zeolite comprises iron in amounts by weight of 0.3 to 3.9 wt %, based on the weight of the iron-containing BEA-type zeolite.

7. A composition active in the selective catalytic reduction of nitrogen oxides comprising a catalytic composition as claimed in claim 1.

8. A washcoating composition comprising the catalytic composition as claimed in claim 1.

9. A method for producing an SCR catalyst, comprising the steps of:
   a) providing a washcoat as claimed in claim 8,
   b) contacting the washcoat with, a support material, and
   c) drying the support material obtained according to step b).

10. A method as claimed in claim 9, wherein the support material is a metallic or a ceramic support material.

11. An SCR catalyst comprising the catalytic composition as claimed in claim 1.

12. An SCR catalyst produced by the method as claimed in claim 9.

* * * * *